(12) United States Patent
Fujiwara et al.

(10) Patent No.: US 9,840,034 B2
(45) Date of Patent: Dec. 12, 2017

(54) MOLD FOR VEHICLE BUMPER FASCIA AND ASSOCIATED MOLDING TECHNIQUE

(71) Applicant: HONDA MOTOR CO., LTD., Tokyo (JP)

(72) Inventors: Kazuhisa Fujiwara, Hilliard, OH (US); Rikiya Suwa, Utsunomiya (JP); Chad Wojniak, Westerville, OH (US); Takashi Abe, Utsunomiya (JP); Youhei Mizukami, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/349,582

(22) Filed: Nov. 11, 2016

(65) Prior Publication Data
US 2017/0057141 A1    Mar. 2, 2017

Related U.S. Application Data

(62) Division of application No. 13/868,200, filed on Apr. 23, 2013, now Pat. No. 9,561,607.
(Continued)

(51) Int. Cl.
*B29C 45/04* (2006.01)
*B29C 45/44* (2006.01)
(Continued)

(52) U.S. Cl.
CPC .......... *B29C 45/44* (2013.01); *B29C 45/0408* (2013.01); *B29C 45/33* (2013.01);
(Continued)

(58) Field of Classification Search
CPC ............................ B29C 45/04; B29C 45/0408
(Continued)

(56) References Cited

U.S. PATENT DOCUMENTS

| 4,531,704 A | 7/1985 | Matthei |
| 4,854,849 A | 8/1989 | Sudo |

(Continued)

FOREIGN PATENT DOCUMENTS

| EP | 0 711 646 A1 | 5/1996 |
| JP | 55-022960 A | 2/1980 |

(Continued)

OTHER PUBLICATIONS

Extended European Search Report / Supplementary European Search Report for Patent Application No. EP 13 78 0730 dated Sep. 9, 2015.

(Continued)

*Primary Examiner* — Christina Johnson
*Assistant Examiner* — Xue Liu
(74) *Attorney, Agent, or Firm* — Arent Fox LLP

(57) ABSTRACT

A mold for producing a vehicle bumper fascia and methods for releasing the bumper fascia are provided. The mold includes a core mold half having a primary mold core. A first movable mold core is slidingly engaged to the primary mold core. A second movable mold core is slidingly engaged to the first movable mold core. A third movable mold core is slidingly engaged to the second movable mold core. Portions of the primary mold core and the movable mold cores together define cavities for forming the mounting rib, a wing portion, and a wheel well flange of the bumper fascia. Methods of releasing the bumper fascia include the steps of providing the mold, disengaging the movable mold cores from each other and from the primary mold core.

8 Claims, 10 Drawing Sheets

Related U.S. Application Data

(60) Provisional application No. 61/637,223, filed on Apr. 23, 2012.

(51) Int. Cl.
  *B29C 45/33* (2006.01)
  *B29L 31/30* (2006.01)
  *B29C 45/40* (2006.01)

(52) U.S. Cl.
  CPC .............. *B29C 2045/4063* (2013.01); *B29L 2031/3044* (2013.01)

(58) Field of Classification Search
  USPC ...................................................... 425/450.1
  See application file for complete search history.

(56) References Cited

U.S. PATENT DOCUMENTS

| | | | |
|---|---|---|---|
| 6,143,227 A | 11/2000 | Heiden et al. | |
| 8,349,240 B2 | 1/2013 | Smith | |

FOREIGN PATENT DOCUMENTS

| | | | |
|---|---|---|---|
| JP | 62-207617 | A | 9/1987 |
| JP | H-05-24491 | A | 2/1993 |
| JP | H-07-266384 | A | 10/1995 |
| JP | 11-077698 | A | 3/1999 |
| JP | 11-291298 | A | 10/1999 |
| JP | 2000-052384 | A | 2/2000 |
| JP | 22-103397 | A | 4/2002 |
| JP | 2006-289945 | A | 10/2006 |
| JP | 2007-160703 | A | 6/2007 |
| JP | 2009-226792 | A | 10/2009 |
| JP | 2009-226828 | A | 10/2009 |
| JP | 2010-036475 | A | 2/2010 |
| KR | 2008-0071519 | A | 8/2008 |
| KR | 2009-048093 | | 5/2009 |
| WO | WO 2011/048487 | A1 | 4/2011 |

OTHER PUBLICATIONS

PCT International Search Report for International Patent Application No. PCT/US2013/037799 dated Jul. 26, 2013 filed Apr. 23, 2013.

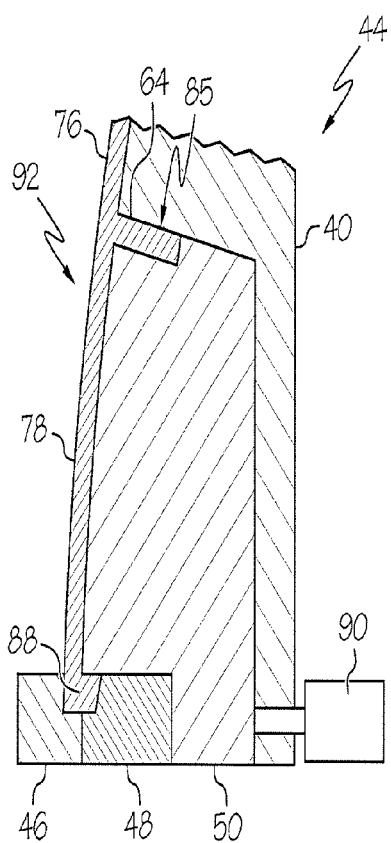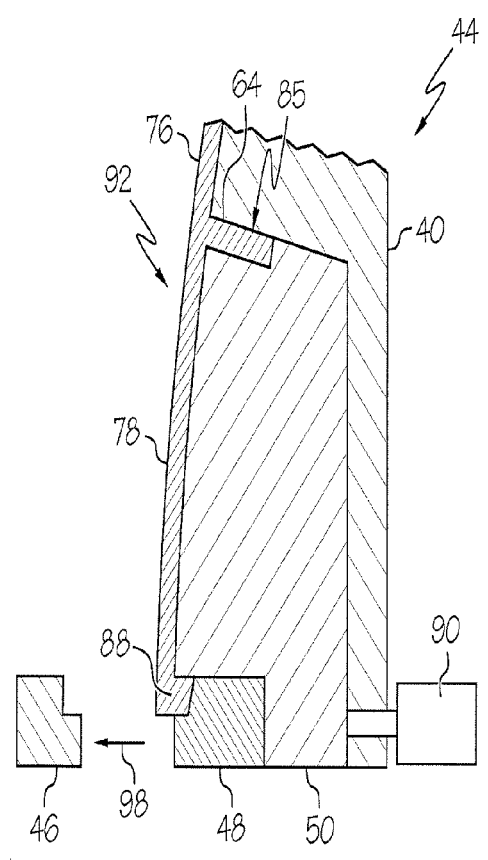
FIG. 6
FIG. 7

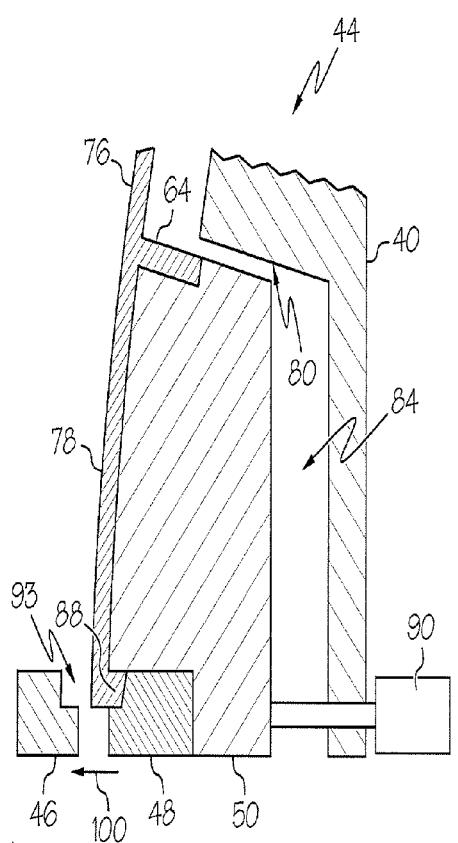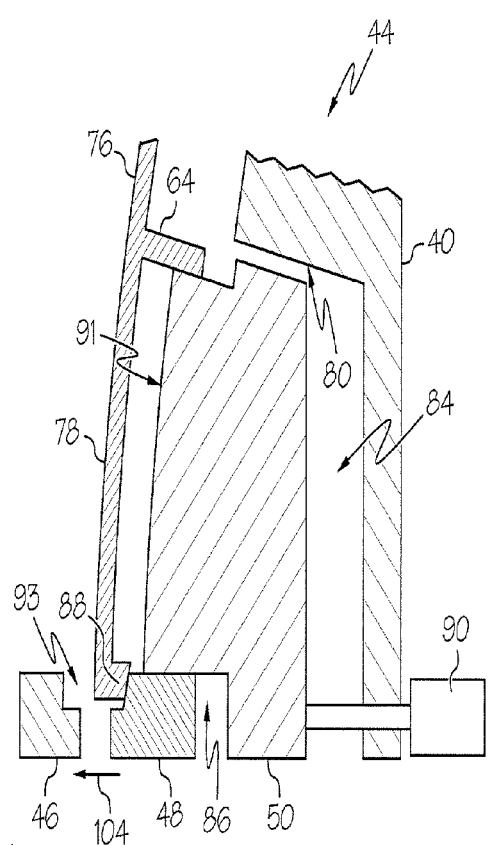

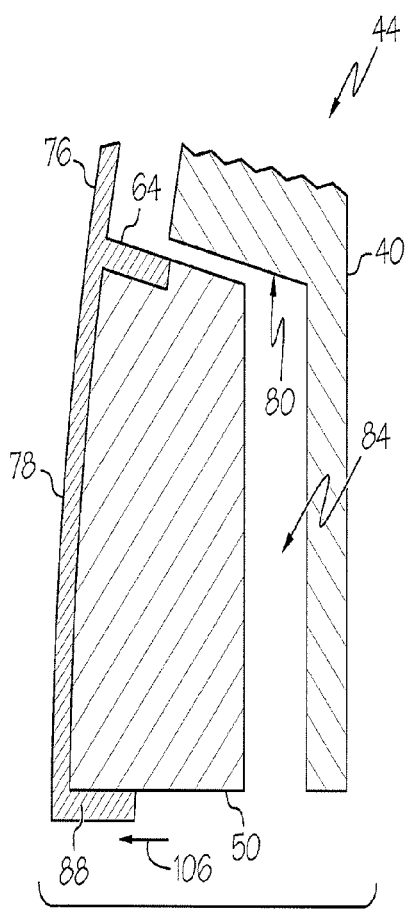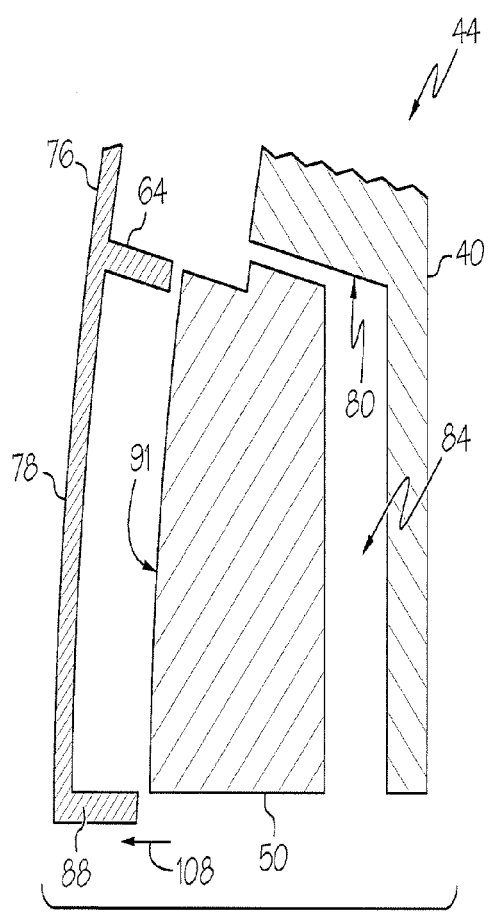

MOLD FOR VEHICLE BUMPER FASCIA AND ASSOCIATED MOLDING TECHNIQUE

CROSS-REFERENCE TO RELATED APPLICATIONS

This application is based upon and is a division of U.S. patent application Ser. No. 13/868,200, filed Apr. 23, 2013, the disclosure of the prior application is hereby incorporated in its entirety by reference. This application claims the benefit of U.S. Provisional Application No. 61/637,223, filed Apr. 23, 2012, the entire disclosure of which is hereby incorporated herein by reference.

BACKGROUND

The present disclosure relates generally to a mold, and more particularly, to a plastic injection mold, and an associated molding system and method for producing a molded part with undercuts removed from a mold with little or no permanent deformation. The molded part may be a vehicle bumper fascia.

Plastic molding is a commonly employed technique for producing parts of simple to complex geometry and may include, without limitation, techniques such as compression molding, injection molding, roto-molding, etc. Injection molding is a popular technique for producing large-scale parts, such as vehicle parts. Injection molding typically utilizes a mold that is divided into two mold halves, for example, one half including a mold cavity and another including a mold core. One half of the mold is affixed to a stationary molding machine platen and the other half is affixed to a moving molding machine platen.

Without limitation, one such part and a part of particular interest in the present disclosure, is a vehicle bumper fascia. As would be well known to one of skill in the art, vehicle bumper fascias are commonly injection molded from various plastic materials. These bumper fascias have a forward or rearward facing surface whose length extends in a width direction along a corresponding front or rear portion of a vehicle, as well as wing sections that extend transversely in the length direction of the vehicle, typically to form a portion of the wheel wells on a vehicle.

Such bumper fascias are typically formed using large injection molds divided into a mold cavity and a primary mold core that cooperate when the mold is closed to form the molded bumper fascia. Secondary cores may also be present. The wing portions of the bumper fascia typically terminate in substantially arch-shaped ends so as to form a portion of what is normally a like-shaped wheel well. These arch-shaped wheel well forming portions of a bumper fascia typically include a flange that extends transversely inward to facilitate attachment of the wing end portion of the bumper fascia to the vehicle body, e.g., via screws or other fasteners.

As one skilled in the art of molding would clearly understand, the inwardly extending flanges of the bumper fascia wheel well portions cannot be molded by a mold having only a typical cavity and stationary core, as creation of the flanges requires an undercut in the mold cavity that would subsequently prevent removal of the bumper fascia after molding. Consequently, as illustrated in FIGS. 1 and 2, known molding techniques for creating such a bumper fascia 20 include a mold 22 with a cavity portion 24, a stationary core portion 26, and outwardly movable side cores 28 that mate with a corresponding section of the mold cavity to form the wheel well flanges 30. After molding, the movable side cores 28 are moved outward to a degree that temporarily deforms the fascia wings and permits the wheel well flanges 30 to clear the mold cores as the bumper fascia is ejected therefrom.

This known molding technique and mold design may adequately function to produce a bumper fascia with inwardly extending wheel well flanges. However, current molds and mold release methods do not include movable mold cores in the flange undercut on the fender cut line (or other body cut lines such as side-panel cut lines). As such, there is a point where a movable mold core helps disengage the wheel arch flange on the bumper fascia from the mold, but stops short of the flange undercut on the fender cut line. This mold and movable mold core arrangement lead to a substantial outward bending of the bumper fascia wheel well flange area in order to allow for mold clearance during part ejection. This has led to undesired permanent deformation of the bumper fascia, leading to higher scrap rates and lost time during vehicle production processes.

Accordingly, it should be apparent from the above remarks that it would be desirable to provide a mold and molding technique that enables movable mold cores to extend along a greater length of the wheel well flange, particularly into the flange undercut on the fender cut line (or other body cut lines). Such a mold and molding technique would eliminate and/or minimize undesired permanent deformation of the bumper fascia as the bumper fascia undercut areas are removed from the mold. The present disclosure provides such a mold and molding technique.

SUMMARY

The following presents a simplified summary in order to provide a basic understanding of some example aspects of the disclosure. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

In accordance with one aspect, a mold for producing a vehicle bumper fascia, wherein the bumper fascia comprises a wing portion at one end, and a wheel well flange and a mounting rib extended from the wing portion is provided. The mold includes a core mold half including a primary mold core. The mold also includes a first movable mold core which is slidingly engaged to the primary mold core. The mold further includes a second movable mold core which is slidingly engaged to the first movable mold core. The mold still further includes a third movable mold core which is slidingly engaged to the second movable mold core. The primary mold core and the first movable mold core together define a first cavity for forming the mounting rib of the bumper fascia. An exterior surface of the first movable mold core defines a portion of a second cavity for forming the wing portion of the bumper fascia. The second movable mold core and the third movable mold core together define a third cavity for forming the wheel well flange of the bumper fascia.

In accordance with another aspect, a method for releasing a vehicle bumper fascia, the bumper fascia comprises a wing portion at one end, and a wheel well flange and a mounting rib extended from the wing portion is provided. The method includes providing a mold including a primary mold core, a first movable mold core slidingly engaged to the primary mold core, a second movable mold core slidingly engaged to the first movable mold core, and a third movable mold core slidingly engaged to the second mold core. The primary mold core and the first movable mold core together define a first cavity for forming the mounting rib of the bumper fascia. An exterior surface of the first movable mold core defines a portion of a second cavity for forming the wing portion of the bumper fascia. The second movable mold core and the third movable mold core together define a third cavity for forming the wheel well flange of the bumper fascia. The method also includes disengaging the third movable mold core from the second movable mold core to release the wheel well flange of the bumper fascia from the third movable mold core. The method further includes disengaging the first movable mold core and the second movable mold core together from the primary mold core to release the mounting rib of the bumper fascia from the primary mold core. The first movable mold core remains engaged with the second movable mold core. The method still further includes disengaging the second movable mold core from the first movable mold core to release the wing portion of the bumper fascia from the first movable mold core.

In accordance with another aspect, a method for releasing a vehicle bumper fascia, wherein the bumper fascia comprises a wing portion at one end, and a wheel well flange and a mounting rib extended from the wing portion is provided. The method includes providing a mold comprising a primary mold core, a first movable mold core slidingly engaged to the primary mold core, a second movable mold core slidingly engaged to the first movable mold core, and a third movable mold core slidingly engaged to the second mold core. The primary mold core and the first movable mold core together define a first cavity for forming the mounting rib of the bumper fascia. An exterior surface of the first movable mold core defines a portion of a second cavity for forming the wing portion of the bumper fascia. The second movable mold core and the third movable mold core together define a third cavity for forming the wheel well flange of the bumper fascia. The method also includes disengaging the third movable mold core from the second movable mold core to release the wheel well flange of the bumper fascia from the third movable mold core. The method then further includes disengaging the first movable mold core and the second movable mold core together from the primary mold core to release the mounting rib of the bumper fascia from the primary mold core. The first movable mold core remains engaged with the second movable mold core. The method then still further includes disengaging the second movable mold core from the first movable mold core to release the wing portion of the bumper fascia from the first movable mold core.

BRIEF DESCRIPTION OF THE DRAWINGS

The foregoing and other aspects of the present disclosure will become apparent to those skilled in the art to which the present disclosure relates upon reading the following description with reference to the accompanying drawings, in which:

FIG. 6 is a cross-section detail view of a portion of the core mold half of FIG. 5 taken along line 6-6 showing the first movable core, the second movable core, and the third movable mold core in engaged positions relative to each other and the primary mold core at a first step of removing a bumper fascia from the mold;

FIG. 7 is similar to FIG. 6 showing the third movable mold core disengaged from the second movable mold core at a second step of removing a bumper fascia from the mold;

FIG. 8 is similar to FIG. 6 showing the third movable mold core disengaged from the second movable mold core and the first and second movable mold cores engaged with each other while disengaged from the first movable mold core at a third step of removing a bumper fascia from the mold;

FIG. 9 is similar to FIG. 6 showing the first, second, and third movable mold cores disengaged with respect to each other and the primary mold core at a fourth step of removing a bumper fascia from the mold;

FIG. 12 is similar to FIG. 10 showing the first movable core in a disengaged position relative to the primary mold core at a third step of removing a bumper fascia from the mold;

FIG. 13 is similar to FIG. 10 showing the first movable core in a disengaged position relative to the primary mold core at a fourth step of removing a bumper fascia from the mold;

DETAILED DESCRIPTION

Figure 1:
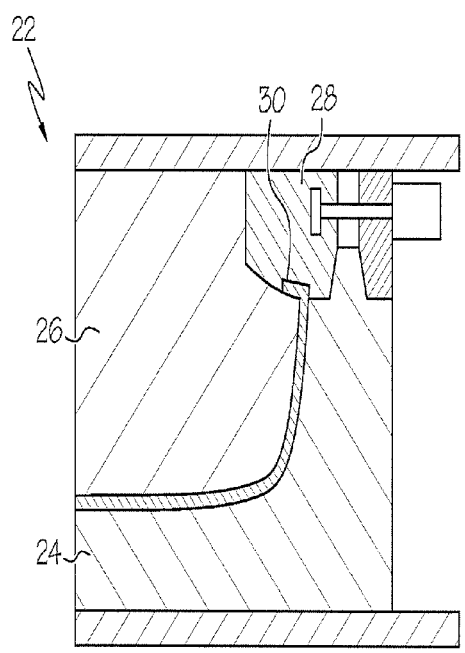
FIG. 1 is a cross-section view of an example vehicle bumper fascia mold of the prior art shown in a closed position.

Example embodiments that incorporate one or more aspects of the present disclosure are described and illustrated in the drawings. These illustrated examples are not intended to be a limitation on the present disclosure. For example, one or more aspects of the present disclosure can be utilized in other embodiments and even other types of devices. Moreover, certain terminology is used herein for convenience only and is not to be taken as a limitation. Still further, in the drawings, the same reference numerals are employed for designating the same elements.

Figure 2:
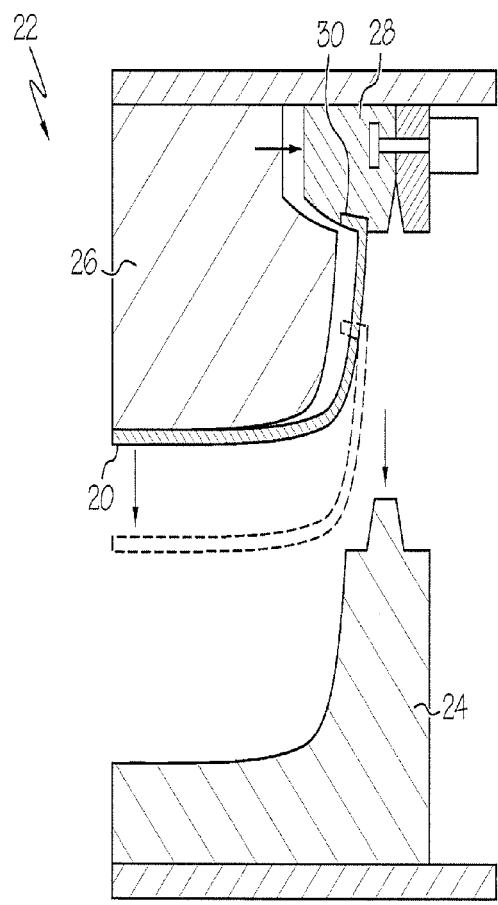
FIG. 2 is a cross-section view of an example vehicle bumper fascia mold of FIG. 1 shown in an open position.
Figure 3:
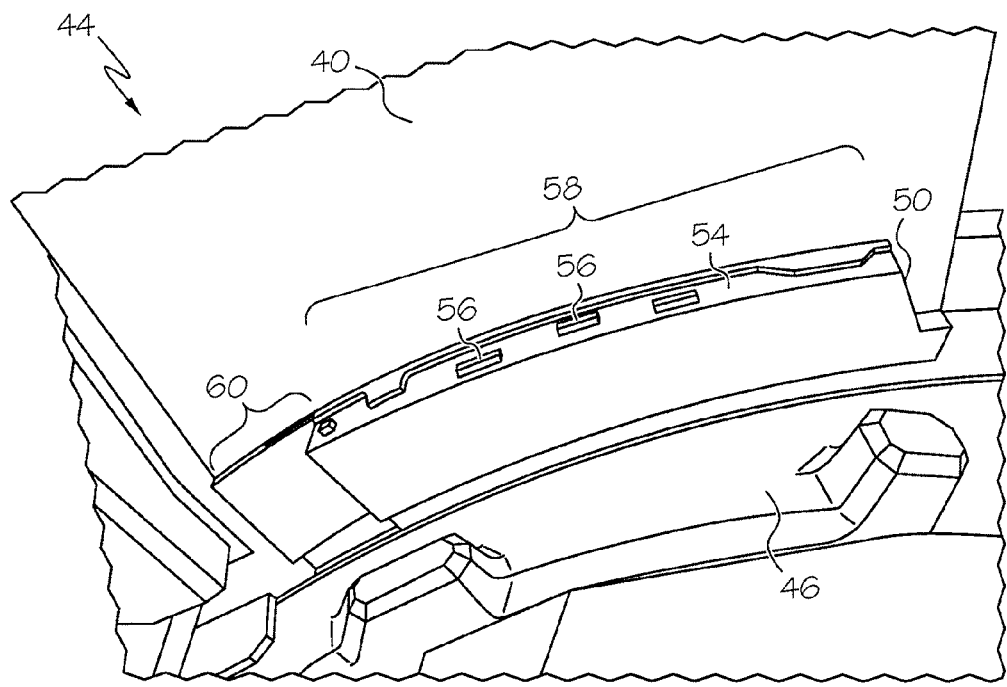
FIG. 3 is a perspective view of a portion of a mold for producing a vehicle bumper fascia according to at least one aspect of the present disclosure showing the core mold half, the primary mold core, the first movable mold core and the second movable mold core.
Figure 4:
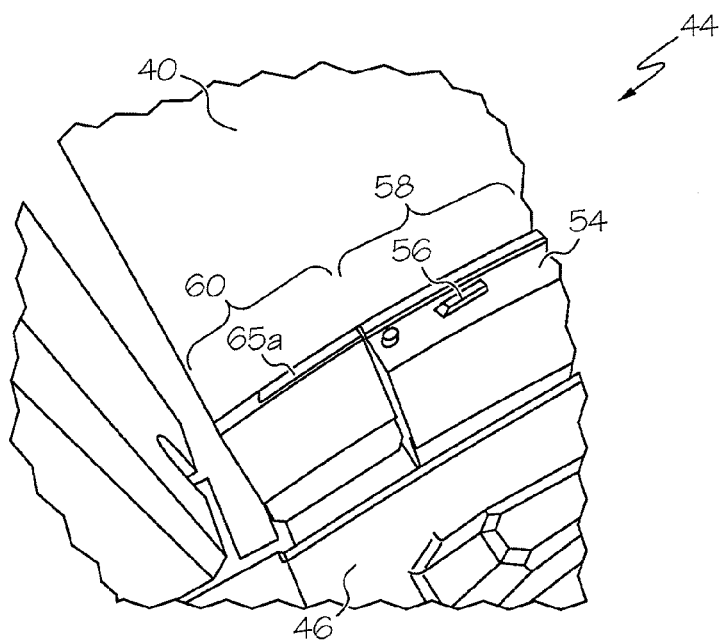
FIG. 4 is a detail perspective view of FIG. 3 showing two portions of the first movable mold core: the left-most portion and the right-most portion.

FIGS. 3 and 4 show slightly different views of one exemplary embodiment of a portion of one side of a primary mold core 40 of a bumper fascia core mold half 44, according to at least one aspect of the disclosure. As is described in more detail below, a third movable mold core (hereinafter third movable mold core) 46 cooperates with a second movable secondary mold core (hereinafter second movable mold core) 48 and a first movable secondary mold core (hereinafter first movable mold core) 50 to produce an undercut flange of the wheel well portion of a bumper fascia molded using the core mold half 44 and a corresponding cavity mold half (not shown). The second movable mold core 48 is not visible in FIGS. 3 and 4. It is to be understood that, for purposes of clarity, FIGS. 3-17 do not show the portion of the mold corresponding with a cavity mold portion, such as cavity portion 24 of FIGS. 1 and 2. However, the cavity mold portion is understood to cooperate with the core mold half 44 to define a cavity that is filled with moldable material to create the vehicle bumper fascia.

The first movable mold core 50 is configured to form a distal end of a bumper fascia wing, including a portion of a wheel well arch that may be unitarily molded into the bumper fascia. An upper surface 54 of the first movable mold core 50 can include various feature-forming elements 56. In one example, the first movable mold core 50 can be divided into a first section 58 and a second section 60 as shown in FIGS. 3 and 4. In another example, the first movable mold core 50 may be of one-piece construction having areas of different shapes or profiles. In the shown example, the first section 58 (bottom-most from a mounted bumper fascia perspective) of the first movable mold core 50 is configured to produce a first portion 62 of a bumper fascia mounting rib 64 (shown in FIG. 17), and the second section 60 (top-most from a mounted bumper fascia perspective) of the first movable mold core 50 is configured to produce a second portion 66 of the bumper fascia mounting rib 64 (shown in FIG. 17). The mounting rib 64 is described in more detail below.

As shown in FIG. 3, the feature-forming elements 56 along the upper surface 54 of the first movable mold core 50 are provided to produce, in conjunction with a corresponding surface of the primary mold core 40, bumper fascia mounting holes 68 (best seen in FIG. 17) in the mounting rib 64 of a molded bumper fascia. The feature-forming elements 56 cooperate with the primary mold core 40 to form localized shutoff areas during the molding process, thereby resulting in the bumper fascia mounting holes 68. For example, the corresponding molding surface of the primary mold core 40 may include one half (or some other portion) of the feature-forming elements 56, which together with the other remaining portion of the feature-forming elements on the first movable mold core 50, cooperate to create shutoffs that form the bumper fascia mounting holes 68. As shown in FIGS. 3 and 4, the feature-forming elements 56 can be raised areas, depressions, etc. that can form any suitable shape including, but not limited to, cylinders, slots, raised areas, etc. The feature-forming elements 56 can include various features that can ease the removal and/or separation of the mounting rib 64 from the mold. It is to be understood that the feature forming elements 56 may be excluded from the first movable mold core 50 within the second section 60.

Figure 5:
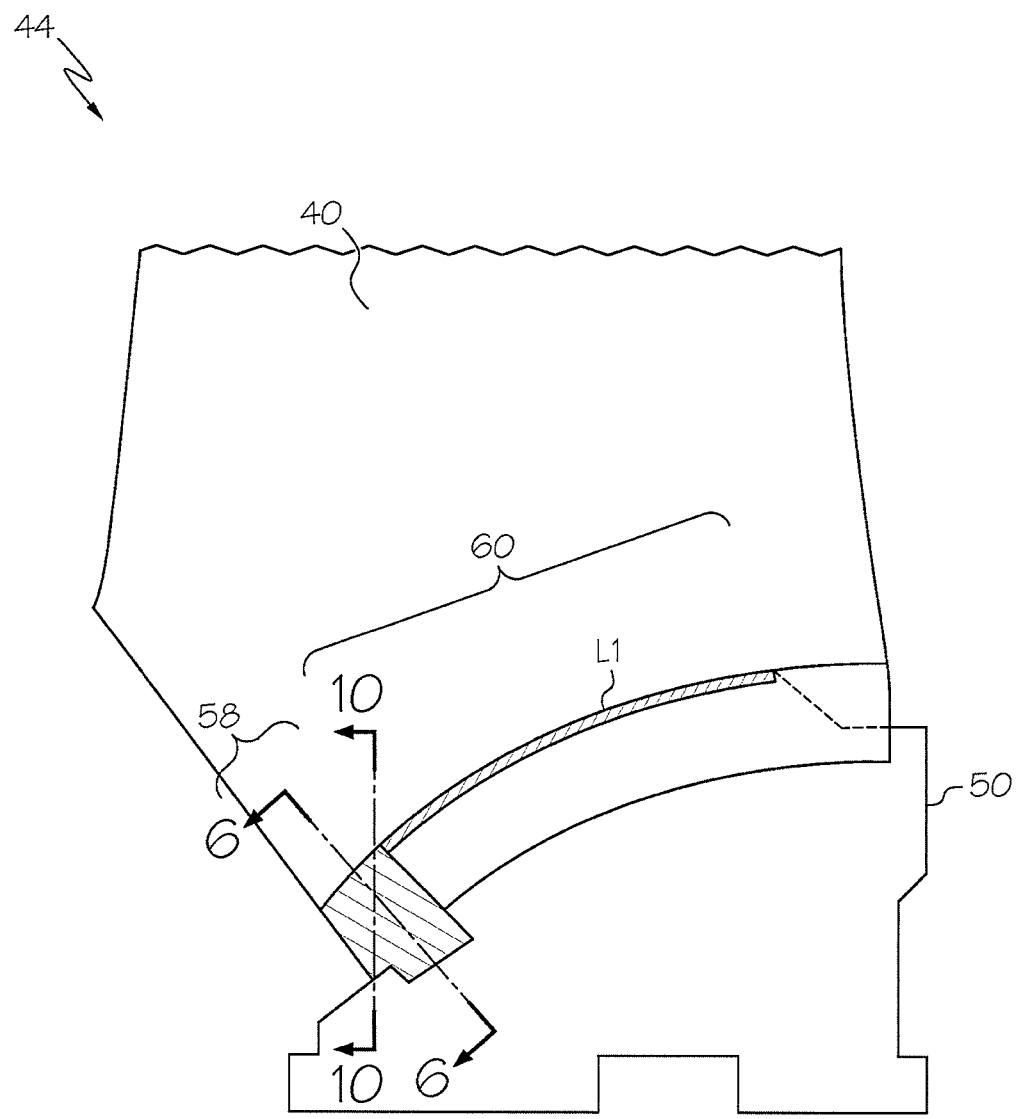
FIG. 5 is a cross-section detail side view of a portion of the core mold half of FIG. 3 showing the spatial relationship between the first movable mold core and the second movable mold core.

A schematic side view of the primary mold core 40 and the first and second movable mold cores 50, 48 within an example core mold half appears in FIG. 5. The movable mold cores 50, 48 can be associated with other mold structure, such as a mold back plate, core guides, wear plates, or any other suitable mold structures that can aid the molding of bumper fascia. In one example, FIG. 5 shows a mold for vehicle bumper fascia used for a rear bumper of a vehicle. A line L1 is highlighted for the purposes of explanation and will be further discussed below. It is to be understood that line L1 does not represent physical structure in FIG. 5.

FIGS. 6-9 illustrate the location and cooperation of the movable mold cores 50, 48, 46 in relation to the primary mold core 40 and each other to mold a wing portion 76 of the bumper fascia. As shown, the first movable mold core 50 cooperates with a correspondingly-shaped recess 84 in the primary mold core 40 to form a distal portion 78 of the wing portion 76. An upper cavity in the first movable mold core 50 also cooperates with an upper face 80 (best seen in FIG. 9) of the recess 84 in the primary mold core 40 to form the mounting rib 64. As such, the primary mold core 40 and the first movable mold core 50 together define a first cavity 85 configured to form the mounting rib 64. The first movable mold core 50 slidingly engages the primary mold core 40 and can be selectively moved into an engaged position as shown in FIG. 6.

When in this engaged position, the first movable mold core 50 can be located substantially within the recess 84 of the primary mold core 40. The second movable mold core 48 is shown slidingly engaged in a recess or cavity 86 located in a portion of the first movable mold core 50. In the shown example of FIG. 6, the recess 86 (best seen in FIG. 9) is located at the bottom of the first movable mold core 50. Similarly, the third movable mold core 46 is shown slidingly engaged with the second movable mold core 48. It is to be understood that the surfaces of the movable mold cores 50, 48, 46 that engage surfaces of the other movable mold cores 50, 48, 46 and/or the primary mold core 40 can be manufactured with relatively tight tolerances so as to tightly mate with their corresponding mating surfaces and minimize any gaps through which molding media can pass.

FIG. 6 also shows an actuator 90 configured to disengage the first movable mold core 50 from the primary mold core 40. The actuator 90 can be automated and can also be powered by hydraulic or pneumatic power systems (not shown) that are connected to the mold. Any suitable actuator 90 can be used including, but not limited to, pneumatic cylinders, hydraulic cylinders, screw devices, etc. As previously discussed, the actuator 90 can selectively slidingly engage the first movable mold core 50 with the primary mold core 40. FIG. 6 shows only one actuator 90, however, a plurality of actuators can be used. Furthermore, a single actuator 90 can selectively slidingly engage each of the first movable mold core 50, the second movable mold core 48, the third movable mold core 46, or any combination thereof. Alternatively, each movable mold core 50, 48, 46 can be provided with its own actuator or a plurality of actuators.

While not shown in FIG. 6, it is to be understood that a portion of the cavity mold half is located just to the left of the wing portion 76. The cavity mold half and the components of the core mold half 44 together form a second cavity 92 for molding operations, such as molding the vehicle bumper fascia. As such, an exterior surface 91 of the first movable mold core 50 defines a portion of the second cavity 92 configured to form the wing portion 76.

A wheel well flange 88 is formed by a combination of the three movable mold cores 50, 48, 46. More particularly, a non-undercut exterior portion of the flange 88 is formed by a corresponding cavity section defined by the third movable mold core 46. An undercut exterior portion of the flange 88 is formed by a corresponding cavity section defined by the second movable mold core 48, while an undercut interior portion of the flange 88 is formed by an overhanging edge of the first movable mold core 50. As such, the second movable mold core 48 and the third movable mold core 46 together define a third cavity 93 configured to form the wheel well flange 88.

FIGS. 6-9 illustrate a method for releasing from a mold the wing portion 76 of the vehicle bumper fascia is now discussed. The views represented by FIGS. 6-9 are sectional views taken along line 6-6 of FIG. 5. A first step of releasing the wing portion 76 as depicted in FIG. 6, shows the core mold half 44 after a molding cycle and mold opening, and after the cavity mold half (not shown) has been withdrawn. As shown, the movable mold cores 50, 48, 46 all remain in their molding positions (or engaged positions) such that the first movable mold core 50 is slidingly engaged with and in relatively tight contact with the primary mold core 40, the third movable mold core 46 is engaged with and in relatively tight contact with the second movable mold core 48, and the second movable mold core 48 is engaged with and in relatively tight contact with the first movable mold core 50. A fully molded wing portion 76 is shown to remain on the core mold half 44.

The method for releasing from a mold the wing portion 76 continues as depicted in FIG. 7. In the shown example, the method includes the step of disengaging the third movable mold core 46 from the second movable mold core 48. This step moves the third movable mold core 46 away from the molded wing portion 76, as indicated by arrow 98. Disengagement releases the wheel well flange 88 from the third movable mold core 46. Disengagement of the third movable mold core 46 can be accomplished by the actuator 90 as previously described. In another example, the third movable mold core 46 can be disengaged by a separate actuator (not shown) such as a pneumatic or hydraulic cylinder, or by various other core actuating means that would be known to one of skill in the art. Depending upon the mold design employed, the actuator used to disengage the third movable mold core 46 may be located on an outboard side of the third movable mold core 46, or may be located on an inboard side, such as in a recess or pocket. Disengagement of the third movable mold core 46 may be guided by a guide element (not shown) if desired, such as guide rods, cylinders, bearings, etc. in order to promote smooth travel of the third movable mold core 46.

Turning to FIG. 8, the method for releasing from a mold the wing portion 76 of the vehicle bumper fascia includes the step of disengaging the first movable mold core 50 and the second movable mold core 48 together from the primary mold core 40. It is to be understood that disengaging the third movable mold core 46 to its position as shown in FIG. 7 enables similar disengagement movement of the other movable mold cores 48, 50. Consequently, the next stage of releasing the wing portion 76 involves simultaneous movement of the second movable mold core 48 and the first movable mold core 50 away from the primary mold core 40. This may be accomplished, for example, by use of an actuator 90 such as a pneumatic or hydraulic cylinder or by another known core actuator that simultaneously displaces the cores 48, 50 in the desired direction as shown by arrow 100. As with movement of the third movable mold core 46, the simultaneous movement of the first and second movable mold cores 50, 48 may be guided by a guide element (not shown) if desired.

As shown in FIG. 8, the described disengagement of the first and second movable mold cores 50, 48 results in a displaced location (non-permanent, or elastic, deformation) of the wing portion 76. Particularly, the first and second movable mold cores 50, 48 are disengaged to a point where the wing portion 76 is sufficiently clear of the primary mold core 40 so as to be ejected or otherwise removed. It can also be observed that the mounting rib 64 is pulled away from the first cavity 85 defined by the first movable mold core 50 and the recess 84 defined by the primary mold core 40. As the first and second movable mold cores 50, 48 are disengaged, the mounting rib 64 travels with the wing portion 76 in the direction represented by arrow 100. In this regard, the mounting rib 64 may be pulled without damage from any feature-forming elements 56 located on the associated upper face 80 of the primary mold core 40. Molding the mounting rib 64 with a slight draw (angle) as shown may facilitate the release of the mounting rib 64 from the upper face 80 of the primary mold core 40.

It can also be observed that during this step of the method, the undercut portion of the wheel well flange 88 remains engaged with the recess 86 of the first movable mold core 50. Consequently, ejection of the wing portion 76 would require a significant deformation of the wheel well flange 88 that could result in permanent deformation and/or damage to the bumper fascia. An additional core disengagement movement is thus employed.

Turning to FIG. 9, the method for releasing from a mold wing portion 76 of the vehicle bumper fascia includes the step of disengaging the second movable mold core 48 from the first movable mold core 50. As with the previous disengagement steps, the step of disengaging the second movable mold core 48 from the first movable mold core 50 urges the second movable mold core 48 in a direction represented by arrow 104. Disengagement of the second movable mold core 48 causes the wing portion 76 (including the mounting rib 64) to be pulled away from the first movable mold core 50 as shown. Disengagement of the second movable mold core 48 continues to a position where the undercut portion of the wheel well flange 88 is clear of the first movable mold core 50. As shown in FIG. 9, after the completion of this step of the method, no portion of the primary mold core 40 or movable mold cores 50, 48, 46 now inhibiting part ejection, the bumper fascia may be removed from the core mold half 44. Bumper fascia removal may be accomplished by traditional ejector means, a part removal robot, etc.

In one example, the disengagement movement of the second movable mold core 48 as described above, continues after the disengagement movement of the first movable mold core 50 ceases. In other words, the step of disengaging the first and second movable mold cores 50, 48 together proceeds into the step of disengaging the second movable mold core 48 as a continuous movement of the second movable mold core 48. The stoppage of the first movable mold core 50 being the event and/or time that marks the change in the steps. This smooth, fluid motion of the second movable mold core 48 can be beneficial to eliminating and/or reducing the deformation of the wing portion 76 during the mold release process. It is also to be appreciated that the step of disengaging the first and second movable mold cores 50, 48 together can also be beneficial to eliminating and/or reducing the deformation of the wing portion 76 during the mold release process.

Further examples of the method can include the step of removing the vehicle bumper fascia from the mold. An operator can then prepare the mold surface in preparation for the next molding cycle, if applicable. In other examples, the mold is located within an automated molding machine that will automatically begin the next molding cycle by engaging the movable mold cores 50, 48, 46 with each other and the primary mold core 40. A typical molding process can then be repeated to mold additional bumper fascia.

Figure 10:
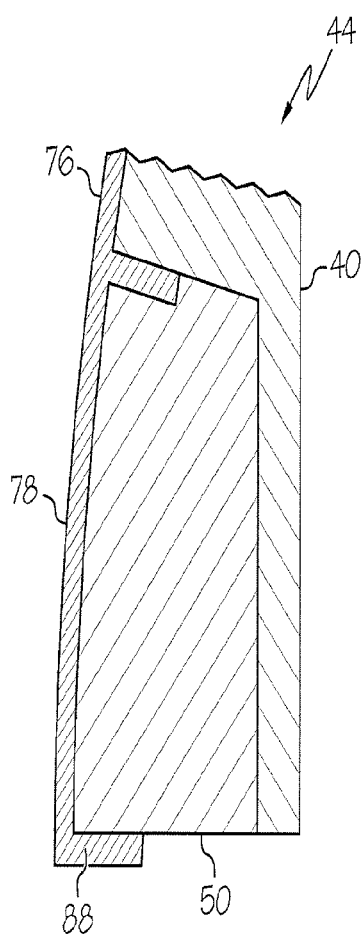
FIG. 10 is a cross-section detail view of a portion of the core mold half of FIG. 5 taken along line 10-10 showing the first movable core in engaged position relative to the primary mold core at a first step of removing a bumper fascia from the mold.

Turning to FIGS. 10-13, the previously described method for releasing from a mold the wheel portion 76 of the vehicle bumper fascia is discussed with reference to another cross-section of the mold. The views represented by FIGS. 10-13 are sectional views taken along line 10-10 of FIG. 5. The first step of releasing the wheel portion 76 of the bumper fascia as depicted in FIG. 10 is the same step illustrated in FIG. 6. At this cross-section, FIG. 10 shows the core mold half 44 after a molding cycle and mold opening, and after the cavity mold half (not shown) has been withdrawn. As shown, the first movable mold cores 50 remains in its molding position (or engaged position) such that the first movable mold core 50 is slidingly engaged with and in relatively tight contact with the primary mold core 40. A fully molded wing portion 76 is shown to remain on the core mold half 44.

Figure 11:
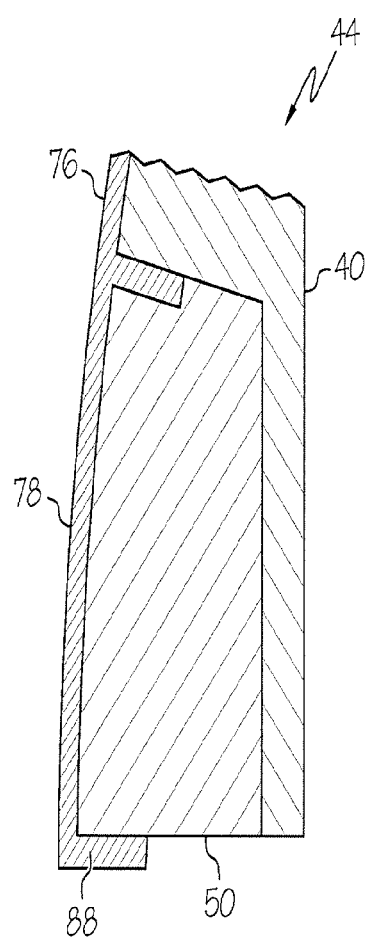
FIG. 11 is similar to FIG. 10 showing the first movable core in engaged position relative to the primary mold core at a second step of removing a bumper fascia from the mold.

The method for releasing from a mold the wing portion 76 of the vehicle bumper fascia continues as depicted in FIG. 11. This step includes disengaging the third movable mold core 46 from the second movable mold core 48 as shown in FIG. 7. However, the third movable mold core 46 does not continue into the portion of the core mold half 44 at this cross-section. As such, the first movable mold core 50 remains in its engaged position.

Turning to FIG. 12, the method further includes the step of disengaging the first movable mold core 50 from the primary mold core 40 (the same step as is illustrated in FIG. 8). The described disengagement of the first and second movable mold cores 50, 48 results in a displaced location (non-permanent, or elastic, deformation) of the wing portion 76. As shown, the first movable mold core 50 is disengaged to a point where the wing portion 76 is sufficiently clear of the primary mold core 40 so as to be ejected or otherwise removed. It can also be observed that the mounting rib 64 is pulled away from the cavity defined by the first movable mold core 50 and the recess 84 defined by the primary mold core 40. As the first movable mold core 50 is disengaged, the mounting rib 64 travels with the wing portion 76 in the direction represented by arrow 106.

Turning to FIG. 13, the method also includes the step of disengaging the second movable mold core 48 from the first movable mold core 50 (best seen in FIG. 9). The second movable mold core 48 does not continue into the portion of the core mold half 44 at this cross-section. However, the bumper fascia includes requisite stiffness such that disengagement of the second movable mold core 48 in another portion urges the wing portion 76 from the first movable mold core 50 in this portion of the core mold half 44. Disengagement of the second movable mold core 48 causes the wing portion 76 (including the mounting rib 64) of the bumper fascia to be pulled away from the first movable mold core 50 in a direction represented by arrow 108. As shown in FIG. 13, after the completion of this step of the method, no portion of the primary mold core 40 or the first movable mold core 50 now inhibiting part ejection, the bumper fascia may be removed from the core mold half 44. Bumper fascia removal may be accomplished by traditional ejector means, a part removal robot, etc.

Figure 14:
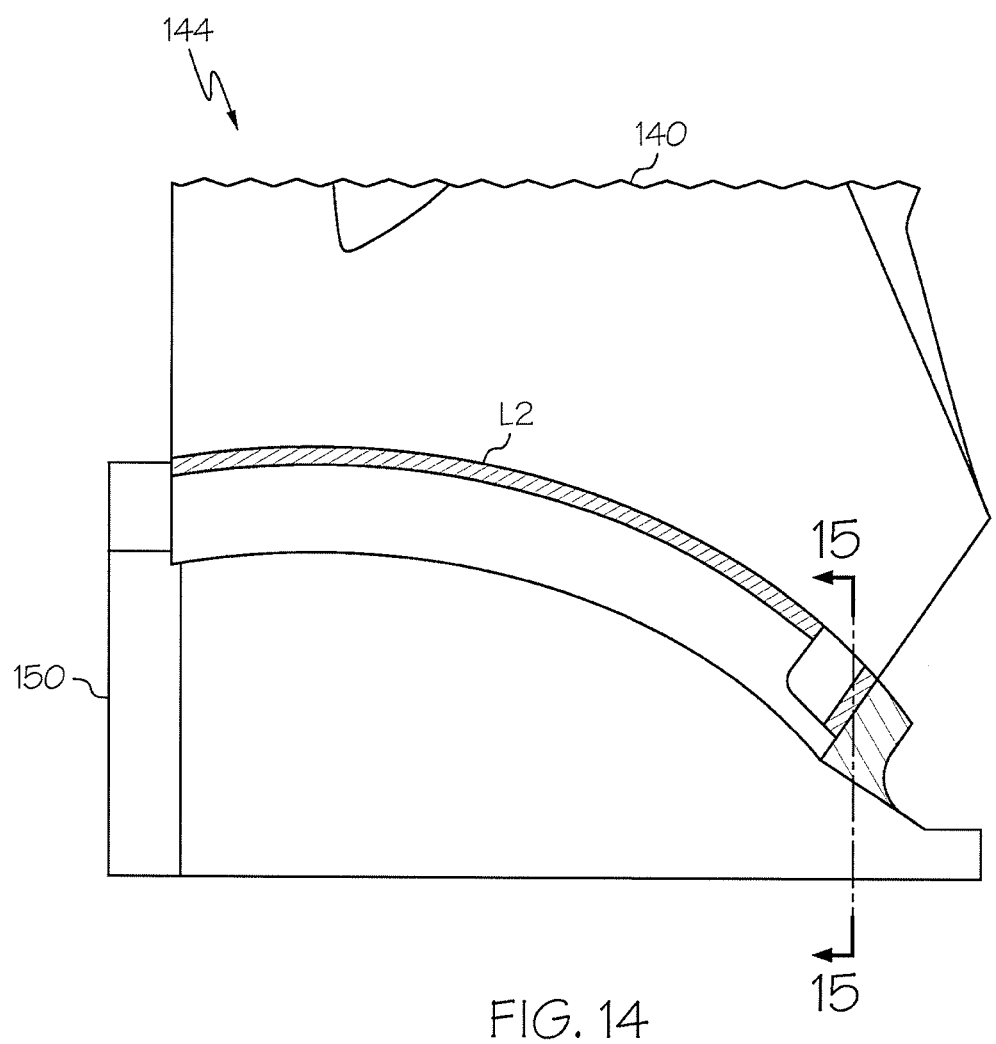
FIG. 14 is similar to FIG. 5 showing a different mold including a primary mold core and a movable mold core.

A schematic side view of a primary mold core 140 and a fourth movable mold core 150 within an example core mold half 144 appears in FIG. 14. The fourth movable mold core 150 can be associated with other mold structure, such as a mold back plate, core guides, wear plates, or any other suitable mold structures that can aid the molding of bumper fascia. In one example, FIG. 14 shows a mold for vehicle bumper fascia used for a front bumper of a vehicle. A line L2 is highlighted for the purposes of explanation and will be further discussed below. It is to be understood that line L2 does not represent physical structure in FIG. 14.

Figure 15:
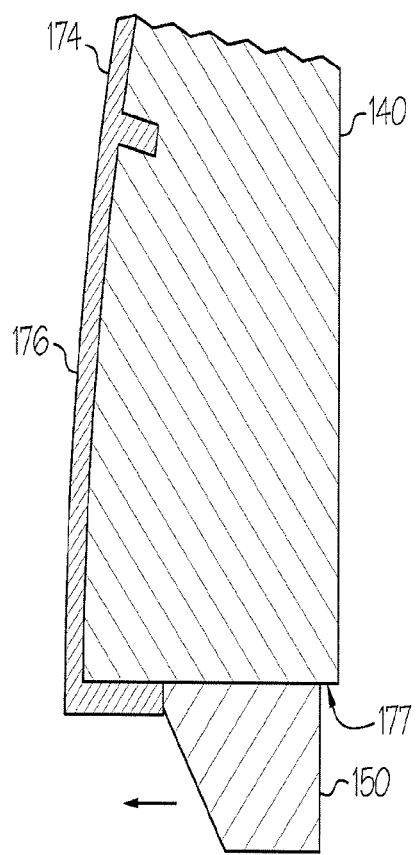
FIG. 15 is a cross-section detail view of a portion of the core mold half of FIG. 14 taken along line 15-15 showing the movable core in a molding position.
Figure 16:
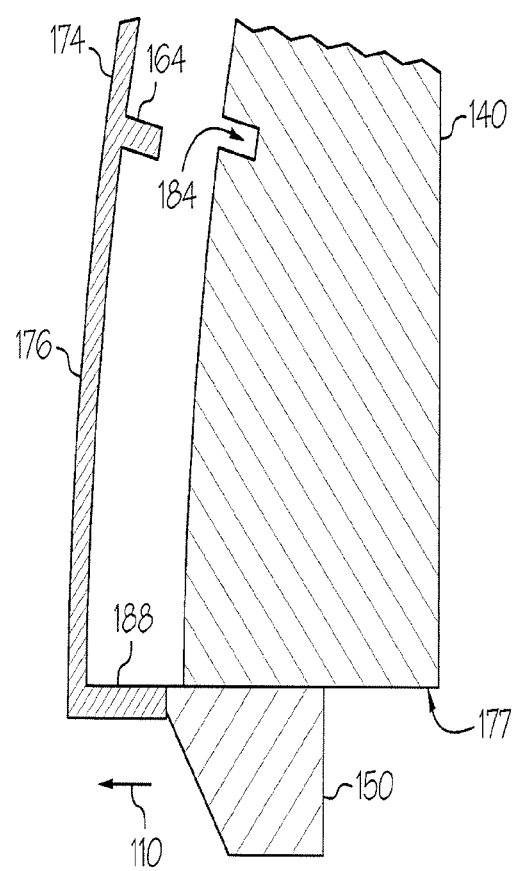
FIG. 16 is similar to FIG. 15 showing the movable core in a removal position.

FIGS. 15-16 illustrate the location and cooperation of the fourth movable mold core 150 in relation to the primary mold core 140 and to mold a wing portion 176 of the bumper fascia. The views represented by FIGS. 15-16 are sectional views taken along line 15-15 of FIG. 14. As shown, the fourth movable mold core 150 cooperates with a surface 177 of the primary mold core 140 to enable release of the wing portion 176 from the core mold half 144. A recess 184 in the primary mold core 140 is configured to form a mounting rib 164. The fourth movable mold core 150 slidingly engages the primary mold core 140 and can be selectively moved into an engaged position as shown in FIG. 15.

Turning to FIG. 16, the fourth movable mold core 150 is disengaged in a direction represented by arrow 110. Disengagement of the fourth movable mold core 150 causes the wing portion 176 (including the mounting rib 164) to be pulled away from the fourth movable mold core 150 as shown. Disengagement continues to a position where the undercut portion of the wheel well flange 188 is clear of the primary mold core 140. As shown in FIG. 16, after the completion of the disengagement, no portion of the primary mold core 140 now inhibiting part ejection, the bumper fascia may be removed from the core mold half 144. Bumper fascia removal may be accomplished by traditional ejector means, a part removal robot, etc.

Figure 17:
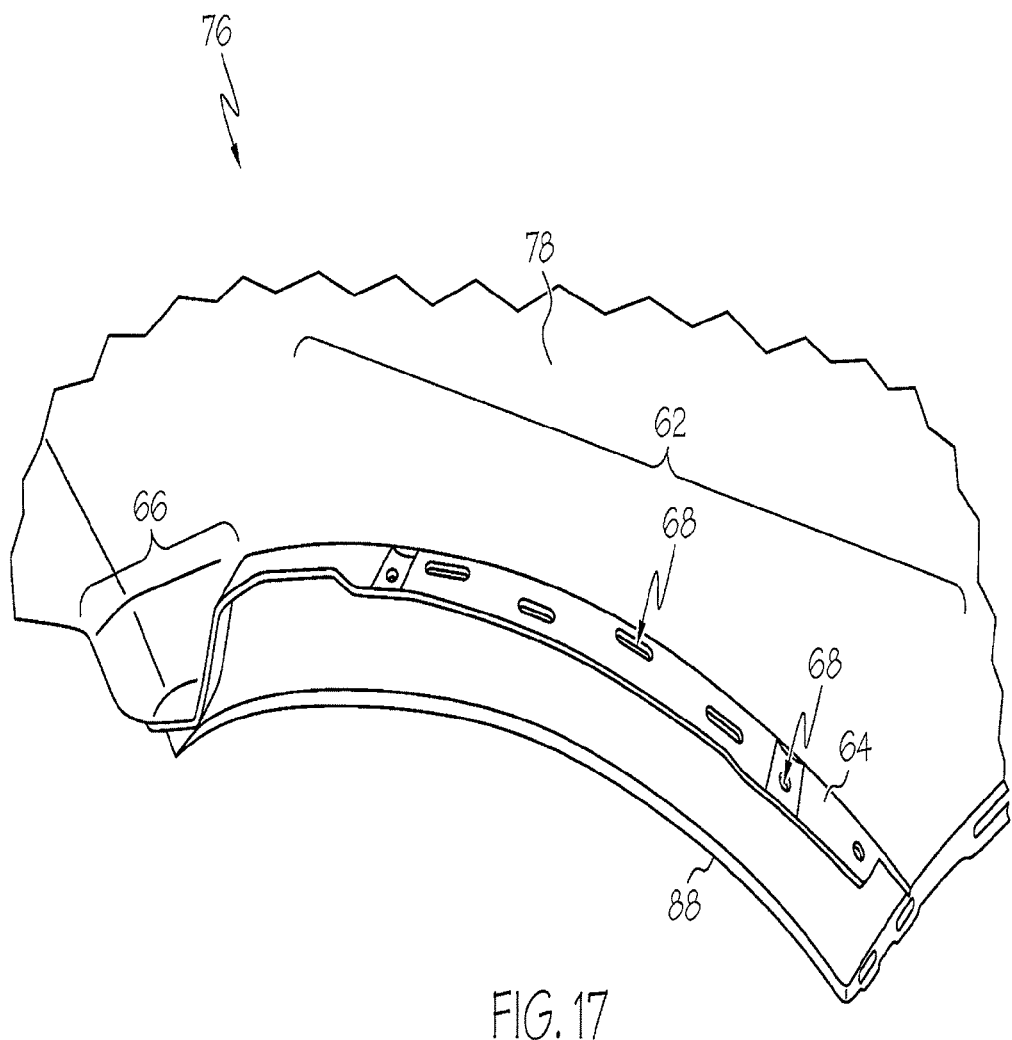
FIG. 17 is a detail perspective view of a wing portion of a bumper fascia molded with the mold of FIG. 3.

Turning to FIG. 17, an interior view of the wing portion 76 of an example bumper fascia described above is shown. The distal portion 78 of the wing portion 78 includes wheel well flange 88 and mounting rib 64 are shown. A number of bumper fascia mounting holes 68 formed in the mounting rib 64 by the feature-forming elements 56 (best seen in FIGS. 3 and 4) are also visible. FIG. 17 also shows the effect of having the first movable mold core 50 divided into a first section 58 and a second section 60. The first section 58 of the first movable mold core 50 produces a first portion 62 of the mounting rib 64, and the second section 60 of the first movable mold core 50 produces a second portion 66 of the mounting rib 64. Designs for each of the two portions 62, 66 can be tailored to the mounting needs for the bumper fascia at that particular area.

Returning to FIG. 5, traditional mold structures were configured to disengage the wheel well flange 88 and the remainder of the wing portion 76 by using a movable mold core (e.g., first movable mold core 50) only in the area of the line L1. This area corresponds with the first section 58 as shown in FIGS. 3 and 4. Disengagement of the movable mold core in the first section only often led to permanent deformation of the bumper fascia around the area of the left end of line L1. This is the area where the first section 58 and the second section 60 meet as shown in FIGS. 3 and 4. Traditionally, movable mold cores were omitted in the second section 60 in order to avoid the flange undercut in the fender cut line (or another body cut line, if desired). The described mold structure now includes at least a first movable mold core 50 and a second movable mold core to provide a more even disengagement (or "core pull") along the entire length of the wheel well flange 88, including at the flange undercut in the fender cut line. This additional structure helps reduce and/or eliminate permanent deformation of the bumper fascia as it is removed from the mold.

It is to be understood that only one set of movable mold cores that would be associated with a core mold half and associated primary core have been described herein. One skilled in the art would understand that a like set of secondary movable mold cores would be installed on the opposite side of the core mold half to form the opposite wing portion of the bumper fascia in conjunction with a corresponding portion of the primary core. The like set of secondary movable mold cores can be identical, albeit mirror images, of the described secondary movable mold cores.

The described mold and associated release methods can include several benefits. Namely, the movable mold cores improve the removal of vehicle bumper fascia from molds by eliminating and/or reducing permanent deformation of any of the bumper fascia components. Elimination and/or reduction of the permanent deformation is a result of including movable mold cores within the mold core half of the mold and operating those movable mold cores in a particular sequence.

The disclosure has been described with reference to the example embodiments described above. Modifications and alterations will occur to others upon a reading and understanding of this specification. Example embodiments incorporating one or more aspects are intended to include all such modifications and alterations insofar as they come within the scope of the appended claims.

What is claimed is:

1. A mold for producing a vehicle bumper fascia, wherein the bumper fascia comprises a wing portion at one end, and a wheel well flange and a mounting rib extended from the wing portion, the mold comprising:
   a core mold half including a primary mold core;
   a first movable mold core, wherein the first movable mold core is slidingly engaged to the primary mold core;
   a second movable mold core, wherein the second movable mold core is slidingly engaged to the first movable mold core; and
   a third movable mold core, wherein the third movable mold core is slidingly engaged to the second movable mold core,
   wherein the primary mold core and the first movable mold core together define a first cavity configured to form the mounting rib of the bumper fascia,
   wherein an exterior surface of the first movable mold core defines a portion of a second cavity configured to form the wing portion of the bumper fascia, and
   wherein the second movable mold core and the third movable mold core together define a third cavity configured to form the wheel well flange of the bumper fascia, and
   wherein the first movable mold core is divided into a first section and a second section, and the first section of the first movable mold core produces a first portion of the mounting rib along a first region of the wing portion that is contacted by the second movable mold core, and the second section of the first movable mold core produces a second portion of the mounting rib along a second region of the wing portion that is not contacted by the second movable mold core.

2. The mold for producing a vehicle bumper fascia according to claim 1, wherein disengaging the second movable mold core from the first movable mold core releases the wing portion of the bumper fascia from the first movable mold core and urges the second portion of the mounting rib of the bumper fascia from the first movable mold core via stiffness of the bumper fascia.

3. The mold for producing a vehicle bumper fascia according to claim 1, wherein the first movable mold core cooperates with the first cavity to produce the mounting rib of the bumper fascia.

4. The mold for producing a vehicle bumper fascia according to claim 1, wherein the first movable mold core cooperates with the second cavity to produce the wing portion of the bumper fascia.

5. The mold for producing a vehicle bumper fascia according to claim 1, wherein the first movable mold core, the second movable mold core and the third movable mold core cooperates with the third cavity to produce the wheel well flange of the bumper fascia.

6. The mold for producing a vehicle bumper fascia according to claim 1, further comprising an actuator configured to disengage the third movable mold core from the second movable mold core.

7. The mold for producing a vehicle bumper fascia according to claim 1, further comprising an actuator configured to disengage the second movable mold core from the first movable mold core.

8. The mold for producing a vehicle bumper fascia according to claim 1, further comprising an actuator configured to disengage the first movable mold core from the primary mold core.

* * * * *